No. 875,448.

PATENTED DEC. 31, 1907.

R. MILNE.
CORE AND CASTING.
APPLICATION FILED JUNE 14, 1907.

Witnesses
Wm. P. Bond
Pierson W. Banning

Inventor:
Robert Milne
by Banning & Banning
Attys.

UNITED STATES PATENT OFFICE.

ROBERT MILNE, OF ROCKFORD, ILLINOIS, ASSIGNOR TO B. F. BARNES COMPANY, A CORPORATION OF ILLINOIS.

CORE AND CASTING.

No. 875,448.        Specification of Letters Patent.        Patented Dec. 31, 1907.

Application filed June 14, 1907. Serial No. 378,989.

*To all whom it may concern:*

Be it known that I, ROBERT MILNE, a citizen of the United States, residing at Rockford, in the county of Winnebago and State of Illinois, have invented certain new and useful Improvements in Cores and Castings, of which the following is a specification.

In the ordinary practice of drilling screw holes in castings for the accommodation of set screws or similar devices, it is customary to drill and thread a hole directly into the metal of the casting, which is often a difficult and laborious undertaking, either by reason of the location of the hole or the heavy and cumbersome character of the casting, for which reasons drills are frequently broken and difficulty, expense and loss of time experienced in providing screw holes of this character.

The object of the present invention is to obviate the difficulties above noted, by embedding a nut in the body of the casting during the molding operation, which not only obviates the necessity for drilling the completed casting at frequently inaccessible points, but also results in a better construction than could be otherwise obtained, in view of the superior quality of the metal ordinarily employed in making nuts.

The present invention relates, more particularly, to the peculiar formation of the core, which permits the nut to be embedded in the manner indicated; and also relates to the completed casting, which is the necessary result of the employment of the hereinafter described core.

The invention consists in the features of construction and combination of parts hereinafter described and claimed.

Figure 1:
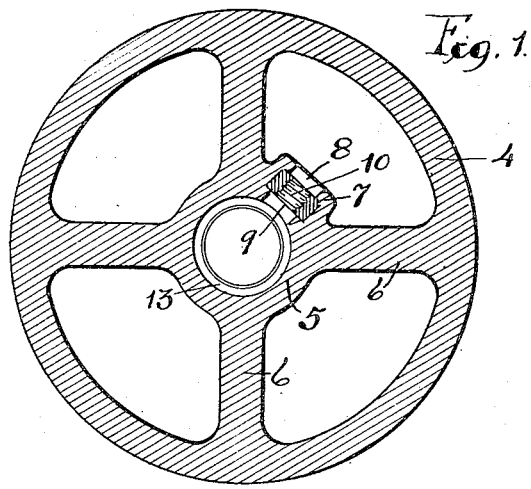
Figure 3:
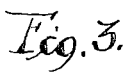
Figure 2:
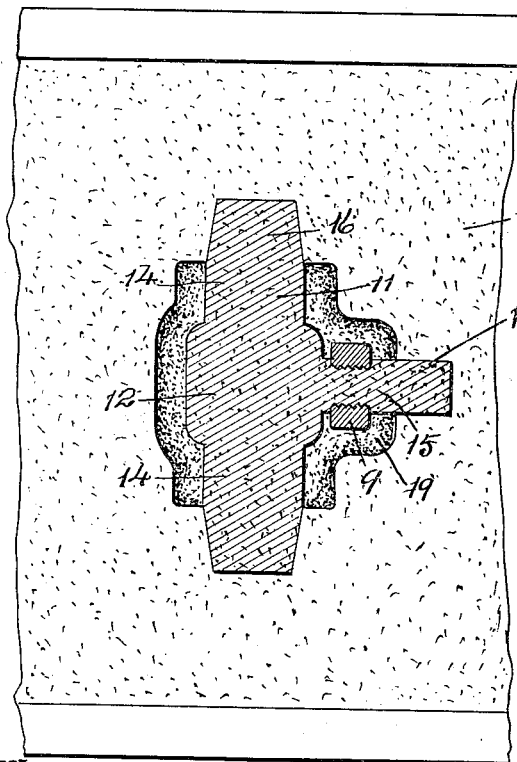
Figure 2:
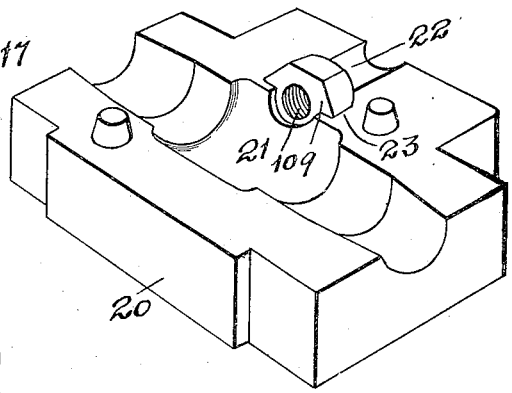

In the drawings, Figure 1 is a sectional plan view of the belt pulley, having a nut embedded in its hub for the reception of a set screw; Fig. 2 a perspective view showing one of the halves of a core box; and Fig. 3 a sectional elevation of a mold and core, illustrating the method by which the nut is embedded.

In Fig. 1 is shown a belt wheel of the ordinary character, comprising a rim 4, and a hub 5 connected with the rim by means of spokes 6. The hub has formed thereon a boss 7, through which extends a hole 8, intermediate the ends of which is embedded a nut 9. The nut is preferably of the ordinary hexagonal variety, as shown in Fig. 2. The screw threaded bore 10 of the nut is of reduced diameter as compared with the diameter of the hole 8, and the nut, being embedded intermediate the ends of the hole, a clearance is provided on the inner and outer sides of the nut, which gives the set screw, when inserted, a better grip on the shaft with which it is intended to coöperate.

It will be understood that the invention is not intended to be limited to a casting of any particularly style, and that the belt pulley herein shown serves merely for the purpose of illustrating the manner in which the nut is formed and embedded. The flat faces of the nut prevent any turning or movement within its socket, and the overhanging inner and outer portions of the casting serve to hold the nut in substantially integral connection with the casting within which it is embedded.

A wheel, or a similar device of the general character above described, is cast with a core 11, the general configuration of which is of the usual style, comprising an enlarged body section 12, adapted to form the enlarged inner chamber 13 of the completed casting and cylindrical end portions 14 of a diameter suitable to embrace the shaft or other structure upon which the casting is intended to be mounted. The core of the present invention, however, differs from the ordinary core, in that it is provided with a stud or post 15, outwardly extending from the body portion of the core, which stud or post extends through the nut 9, which is positioned and mounted upon the core stud during the operation of forming the core. The cylindrical end portions 14 of the core terminate in tapered end prints 16, and the stud 15 terminates in a stud print 17, which prints enable the core, as a whole, to be properly positioned and held in the sand mold 18, which is formed in the usual manner. The core stud is of uniform diameter, both inside and outside of the nut, but the necklike portion, which extends through the nut and fills the threads thereof, is of somewhat reduced diameter, which gives a clearance in the completed casting, bo'. inside and outside of the nut. As shown in Fig. 2, the opening 19 in the mold 18 is of suitable size and shape to thoroughly embed the nut in the hub of the casting, in the manner shown in Fig. 1.

The core of the character above described is formed in a core box 20, one-half of which is shown in Fig. 2, which core box has, through its center, a groove or channel 21 of the proper configuration to form a core of the shape above described, and the channel has outwardly extending therefrom a stud channel 22, which is provided at a suitable point with a recess 23, of suitable size and shape to permit a nut to be dropped thereinto and clamped in place when the companion section of the core box is inserted.

In making the core, a nut is laid in one of the sections of the core box, and thereafter the companion section of the box is clamped in place and the core box filled with the core composition, which is packed through the threaded hole in the nut, so that the embedded nut becomes, in effect, an integral part of the core and occupies its proper place in the mold when the core is inserted. When the metal is poured into the mold, it fills in around the nut, without finding ingress into the threads thereof, so that after the core has been broken out of the completed casting the threads of the nut will be clean and ready to receive the set screw or other screw member intended to coöperate with the nut.

By the employment of a core box and core formed in the manner indicated, the difficulty of making cores and castings is not appreciably increased, and the drilling operation is entirely dispensed with, and with it the difficulties attendant on the manipulation of heavy and bulky castings, which frequently require drilling at practically inaccessible points. It will thus be seen that the present invention effects a very material saving in time and labor and in the wear and tear on drilling machinery incident to the drilling of holes in large castings. At the same time the strength and quality of the completed casting will ordinarily be improved, by reason of the fact that nuts are ordinarily formed of a higher grade of metal than is employed in the making of castings, so that the resulting structure will provide a better socket for the reception of a set screw than could be provided by the ordinary direct methods of forming the screw holes for set screws.

What I regard as new and desire to secure by Letters Patent is:

1. A core provided with a stud or post outwardly projecting from the body of the core, and a nut surrounding the stud or post and having the material thereof passed through the threaded interior of the nut, substantially as described.

2. A core provided with a stud or post outwardly extending from the body thereof, and a nut surrounding the stud or post at a suitable distance from the wall of the body, the stud or post extending beyond the outer face of the nut for embedding the inner and outer faces of the nut within the casting, substantially as described.

ROBERT MILNE.

Witnesses:
SAML. H. RECK,
MAUDE E. PALMITER.